United States Patent
Neumann

[15] 3,666,198
[45] May 30, 1972

[54] SEAT BELT REEL
[72] Inventor: Bernhard Neumann, Bauscheim, Germany
[73] Assignee: General Motors Corporation, Detroit, Mich.
[22] Filed: June 29, 1970
[21] Appl. No.: 50,565

[30] Foreign Application Priority Data
July 12, 1969 Germany...................P 19 35 539.6

[52] U.S. Cl..................................242/107.4, 297/386
[51] Int. Cl. .......................................A62b 35/00
[58] Field of Search...........242/107 SB, 107.4, 107.5, 107.6, 242/107.7; 297/386, 388, 389; 280/150 SB

[56] References Cited
UNITED STATES PATENTS

| 3,442,466 | 5/1969 | Fritsche | 242/107.4 |
| 3,420,573 | 1/1969 | Holmberg | 242/107.4 X |
| 3,058,687 | 10/1962 | Bentley | 242/107.4 |
| 3,323,749 | 6/1967 | Karlsson | 242/107.4 |
| 3,178,225 | 4/1965 | Bayer | 297/386 |
| 3,561,690 | 2/1971 | Muskat | 297/386 X |

Primary Examiner—Stanley N. Gilreath
Assistant Examiner—Werner H. Schroeder
Attorney—H. Furman

[57] ABSTRACT

This invention relates to safety belts for use in vehicles to retain passengers in their seats in the event of rapid acceleration or deceleration of the vehicle. This application discloses a seat belt of the inertia reel type which allows the passenger restrained by the belt to make relatively slow movements to extend the belt from the reel but which locks the belt against further movement in the event of rapid changes in motion of the vehicle, an inertia reel seat belt according to the invention being provided with an extra safety feature in the form of an energy-absorbing device which is capable of absorbing energy from the seat belt when the force exerted on the seat belt exceeds a predetermined amount.

4 Claims, 5 Drawing Figures

PATENTED MAY 30 1972
3,666,198
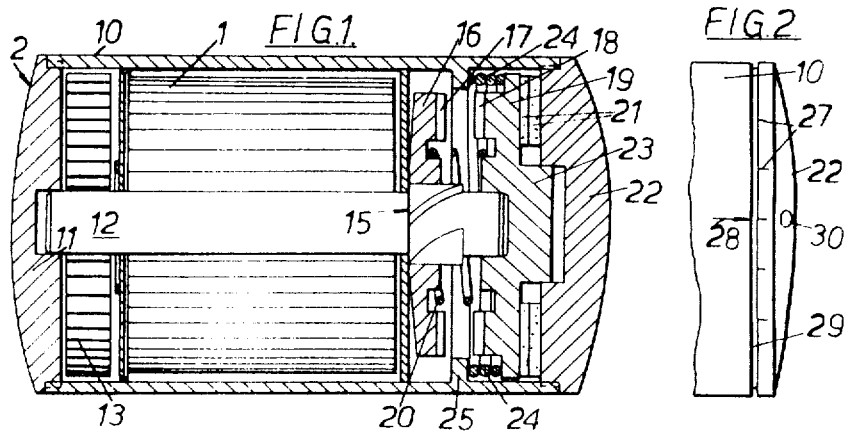
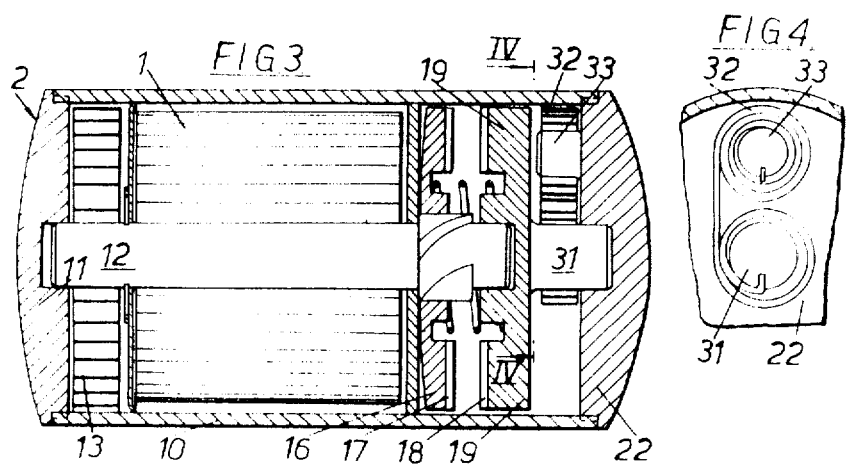
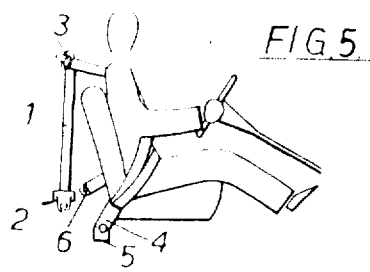
Inventor
Bernhard Neumann
BY Herbert Furman
Attorney

SEAT BELT REEL

BACKGROUND OF THE INVENTION

A safety belt according to the invention is a safety belt having all the desirable features of an inertia reel safety belt in combination with an energy-absorbing absorbing device to limit the maximum load exerted on the belt.

The action of inertia reel safety belts is such that under slow movements of the vehicle passenger, the belt can be withdrawn from the inertia reel. If the movement takes place with a sudden jerk, then withdrawal of the belt is prevented by an arresting mechanism. Again, arresting of the belt may take place when the vehicle—and therefore the inertia reel safety belt also—experiences a retardation or deceleration beyond a certain value. There are undoubtedly advantages in the provision of such an inertia reel safety belt in a vehicle because passengers are often more ready to make use of the safety belt, it ensures freedom of movement when worn and it prevents the belt from lying around in the vehicle when it is not in use.

In order to increase absorption of energy; devices known as force limiters or damping members can be used. These either act as elongation members in the safety belt or consist of a coiled-up metal band which, when sufficient tractive force is exerted on the belt, is wound up on another roller which is connected to the belt.

The present invention provides a safety belt employing an inertia reel and an energy-absorbing device in one constructional unit. Preferably the energy-absorbing device is accommodated in the housing of the inertia reel.

DESCRIPTION OF THE INVENTION

A safety belt according to the invention comprises a vehicle seat belt having at least two elongated flexible elements adapted to pass around a passenger in a seat in the vehicle and to be releasably engaged one with the other, at least two anchorage means for fastening the flexible elements to the vehicle frame, one of the anchorage means having secured to it, in combination, an inertia reel mechanism comprising a housing, spindle means rotatable within the housing, the spindle means including a spool portion to which is fastened one end of one flexible element, spring means urging the spindle means to rotate in a direction in which the flexible element is wound on the spool portion, and an inertia means within the housing adapted to lock the spindle means against rotation in a direction in which the flexible element is unwound from the spool portion when the vehicle is subjected to a rapid change in motion; and an energy absorbing means which is in turn, connected to the flexible element in such a manner that any force exerted by the flexible element on the anchorage means occurs via the energy-absorbing means, the energy-absorbing means being adapted to absorb energy from the flexible element.

The inertia means employed in the inertia reel mechanism can be any of the inertia means already known for use in such reels, such as an inertia wheel threaded onto a threaded portion of the spindle or shaft carrying the spool portion of the inertia reel, or a locking pawl-ratchet wheel assembly connected to the spool portion of the inertia reel, the locking pawl being actuated by a small pendulum sensitive to the acceleration forces generated by the vehicle when in motion.

The energy-absorbing means can be any energy-absorbing means compact enough to be used in combination with the inertia reel mechanism, such as a coiled-band shock absorber which when subjected to a tractive force exceeding a predetermined limit absorbs energy by winding a steel band from one pin onto another pin or a corrugated metal strip of such a size and shape that it will plastically deform to absorb the energy.

Preferably the energy-absorbing means is located within the housing of the inertia reel mechanism so that the combined unit is made as small and as compact as is possible and the fitting of the combined unit to the vehicle frame is rendered as simple as possible.

A principal object of the invention is to provide a vehicle safety belt having all the desirable features of an inertia reel safety belt combined with the extra feature of an energy-absorbing means.

Another object of the invention is to provide an inertia reel safety belt having an energy-absorbing means within the inertia reel housing, the energy-absorbing means only being brought into action at a predetermined load.

Another object of the invention is to provide an inertia reel safety belt having an energy-absorbing means within the inertia reel housing which is only brought into action at a predetermined load, the predetermined load being adjustable by a manual control on the inertia reel housing.

By combining the inertia reel mechanism and the energy-absorbing means there is the further advantage that the energy-absorbing means can be appropriately formed by a friction device which consists of a portion arresting the belt shaft up to a certain loading of the belt, and of a portion of the housing of the inertia reel. A simple construction for the combined unit is attained if the portion of the friction device formed by the housing constitutes a screw-threaded cap which closes one end of the inertia reel housing by engaging a screw-threaded portion in the housing.

However, it is also possible to employ in place of the friction device a known coiled-band force limiter as the energy-absorbing means by arranging that after a certain loading of the belt is exceeded, the shaft of that part of the inertia reel mechanism that arrests the belt shaft rotates against the force exerted by the coiled metal band connected to it, causing the metal band to unwind from a stationary pin onto the shaft.

Adjustability of the energy-absorbing means can be attained for example, when using the coiled-band force limiter described above by giving appropriate turns to the screw-threaded cap which closes one end of the housing as previously described. The stationary pin of the coiled band force limiter is located inside this cap and the rotation of the cap causes the spring of the force limiter to be tightened or relaxed so that the force limiter operates whether at a relatively high loading or a relatively low loading of the belt.

The appended claims define the scope of the invention claimed. The invention and how it may be performed are hereinafter particularly described with reference to the accompanying drawings in which:

FIG. 1 is a section view through an inertia reel mechanism in combination with a built-in energy-absorbing means, FIG. 2 is an elevation view of the right-hand end of the mechanism, FIG. 3 is a section view through an inertia reel mechanism in combination with another embodiment of the energy-absorbing means, FIG. 4 is a partial section view taken along line IV—IV in FIG. 3, and FIG. 5 is a view of the safety belt in use in a vehicle.

As shown in FIG. 5, a flexible belt 1 runs upwards from an inertia reel 2 arranged at the bottom end of the side panel of the vehicle. The belt 1 passes through an anchor ring and then it runs transversely across the chest of the car passenger. The belt is fastened to an anchorage 5 by means of a readily releasable lock 4. From the lock 4, the belt passes across the pelvis of the occupant over the other side again to an anchorage point 6.

The inertia reel 2 shown in FIG. 1 consists of a tubular portion 10 internally screw-threaded at both ends into the left-hand end of which is screwed a screw-threaded cap 11. One end of a spindle 12 is mounted in this cap 11, one end of the belt 1 being secured in a diametrically extending slot (not shown) in a spool portion of this spindle for the purpose of winding up the belt 1 on spindle 12. A coiled spring 13 is connected to the spindle 12 and also to the housing portion 10, this spring 13 constraining the spindle 12 to turn in such a way that belt 1 is wound on to shaft 12 and is thus drawn into the inertia reel 2.

For the sake of clarity, FIGS. 1–4 omit to indicate the position of the attachment eyes on the inertia reel for securing the latter to the side panel or to the floor of the vehicle and also omit to illustrate the manner in which the belt 1 emerges from the inertia reel 2.

The spindle 12 is provided with a thickened portion in which helical screw threads 15 of coarse pitch are provided. These screw threads 15 are engaged by an inertia wheel 16 having an internal bore which is threaded internally to engage the screw threads of the thickened portion of spindle 12 and which is provided with an upstanding saw-toothed annular ring 17 upon its face. Opposite this upstanding saw-toothed annular ring 17 there is situated a corresponding upstanding saw-toothed annular ring 18 of a stationary wheel 19 which serves as a stop means for the spindle 12 as will be described later in the specification. Arranged between the inertia wheel 16 and the stationary wheel 19 is a spring 20 which keeps the inertia wheel 16 and the portion 19 spaced apart when the spindle 12 is at rest or is only rotating slowly.

The stationary wheel 19 is not rigidly connected with the housing portion 10, but is connected to it through an annular friction pad coupling 21, secured to the internal face of the screw threaded cap 22 which is screwed into the housing portion 10, i.e. for normal loading of the belt 1, wheel 19 is firmly connected with the housing portion 10. The wheel 19 is mounted co-axially in cap 22 by means of a cylindrical projection 23 so that it is able to rotate within cap 22. The right-hand end of the spindle 12 is mounted coaxially in wheel 19. A spring 24 is compressed between an annular extension 25 of casing portion 10 and a corresponding annular extension on the wheel 19 and ensures that wheel 19 is firmly pressed against the cap 22 via the friction pad coupling 21, the friction pads of which have a high coefficient of friction.

The mode of operation of this inertia reel mechanism when responding rotationally lockingly engaged by the inertia wheel when rapid change in rotation of the spindle occurs the belt 1, is as follows: If the belt unwound is slowly pulled portion, of the inertia reel 2 in opposition to the action of the spring 13, the inertia wheel 16 turns with the spindle 12 without displacing itself axially along the spindle. However, the inclination of the screw threads 15 is such that with a more rapid movement of the belt 1, the inertia of the wheel 16 causes it to be displaced axially along spindle 12 in the direction of the wheel 19, against the spring 20, which becomes compressed. This results in saw-toothed annular ring 17 of wheel 16 engaging with the saw-toothed annular ring 18 of wheel 19 which causes inertia wheel 16 to be arrested. When this happens, the spindle 12 and therefore the belt 1, are also arrested and the belt cannot be pulled out of the inertia reel any further. If belt 1 is released it allows the spindle 12 to start to rotate in the opposite direction, which causes the inertia reel 16 tp move back along the spindle into its previous position, aided by spring 20, and thereto free the belt 1. The belt is then wound up again on the spool portion of spindle 12 in the usual way by the spring 13.

When belt 1 is rapidly unwound, the inertia wheel 16 moves axially into engagement with the stationary reel 19, thus locking the spindle 12 of the inertia reel, and the belt 1, against further movement, as has already been described. Upon the attainment of a predetermined loading of the belt 1, slip will occur between the friction pads of the friction pad coupling 21, thus allowing wheel 19 to gradually rotate relative to the housing portion 10, in a direction allowing the further gradual extension of the belt 1 from the inertia reel 2. During this rotation of wheel 19, energy is consumed in overcoming the frictional forces existing between the pads of the friction pad coupling 21.

In order that adjustment may be made to the energy-absorbing means as provided by the items 19, 21, 22 and 24 in FIG. 1, the cap 22 is screwed further into the housing portion 10. The spring 24 which presses the wheel 19 against the cap 22 is thereby compressed further and thus exerts more force on the friction pad coupling 21, which in turn increases the force required to rotate wheel 19. For this purpose of adjustment the cap 22 is provided with divisions 27 and the housing portion 10, with a mark 28. The amount of adjustment is consequently apparent from the relative positions of divisions 27 with mark 28. When the cap 22 is unscrewed out of the housing portion 10, it creates a gap 29. Preferably, this is filled up by an expandable distance ring, in order that the cap 22 may be firmly retained against vibration in every setting. A suitable tool for turning the cap 22 may be for example a plug-in key and appropriate holes 30 are provided for this purpose in cap 22.

An embodiment of the invention utilizing an inertia reel mechanism in combination with another form of energy absorbing means is illustrated in FIG. 3. The inertia reel 2 with its arresting mechanism is the same as that described in FIG. 1, except that there is a modification to wheel 19, which in this case is mounted in cap 22 by means of a pivot 31.

The wheel 19 is secured against rotation for a normal loading of the belt by a metal band 32 which is connected at one end to the pivot pin 31. The band 32 which passes round pin 31 by about one turn, is wound on a second pin 33 several turns and is secured to it. Pin 33 is firmly connected with cap 22. If the saw-toothed annular ring 17 of inertia wheel 16 engages with the saw-toothed annular ring 18 of wheel 19, then, first of all, wheel 16, the spindle 12 and the belt 1 are arrested. Wheel 19 under these conditions is prevented from rotation by the tension of band 32. It is only at a greater predetermined loading on belt 1 that the force exerted by band 32 against the rotation of wheel 19 is overcome. Wheel 19 then rotates, causing the band 32 to roll itself off pin 33 and on to pin 31. Due to the winding on of spring 32 onto pin 31 a corresponding amount of energy is absorbed. Consequently, the belt 1 is drawn out of the inertia reel 2 by only a small amount for a large expenditure in energy.

Of course the invention is not limited to the embodiments shown and described; indeed it is quite possible to arrive at further combinations to create a component embodying other types of inertia reel and energy-absorbing means.

What is claimed is:

1. A seat belt reel for use in a vehicle, comprising:
 a housing, a spindle rotatable within the housing, the spindle including a spool portion to which is fastened one end of the seat belt and a threaded portion having at least one helical screw thread of coarse pitch, spring means urging the spindle to rotate in a direction in which the seat belt is wound on the spool portion,
 an inertia wheel adapted to engage upon the screw thread of the threaded portion of the spindle and to rotate with it in either direction, any rapid change in the rotation of the spindle causing the inertia wheel to move along the threaded portion of the spindle in a direction dependent upon the direction of rotation of the spindle,
 a rotatable stop means adjacent the inertia wheel and engaged in rotational locking relationship by the inertia wheel when rapid change in the rotation of the spindle occurs in a direction in which the seat belt is unwound from the spool portion,
 and a friction pad coupling means connecting the rotatable stop means to the housing and being predeterminately loaded to impede rotation of the stop means so that, after the spindle has been locked against rotation by the inertia wheel engaging the rotatable stop means and the force exerted upon the seat belt exceeds a predetermined amount, energy is absorbed by further restricted rotation of the locked spindle, inertia wheel and stop means relative to the housing, in a direction in which the seat belt is unwound from the spool portion, against the braking force exerted by the friction pad coupling means.

2. A seat belt reel for use in a vehicle, comprising:
 a housing, a spindle rotatable within the housing, the spindle including a spool portion to which is fastened one end of the seat belt and a threaded portion having at least one helical screw thread of coarse pitch, spring means urging the spindle to rotate in a direction in which the seat belt is wound on the spool portion, an inertia wheel adapted to engage upon the screw thread of the threaded portion of the spindle and to rotate with it in either direction, any rapid changes in the rotation of the spindle causing the inertia wheel to move along the threaded portion of the spindle in a direction dependent upon the direction of rotation of the spindle, a rotatable stop means adjacent the spindle, and adapted to be rotationally lockingly engaged by the inertia wheel when rapid change in rotation of the spindle occurs in a direction in which the seat belt is unwound from the spool portion, and a spring-loaded coupling means connecting the stop means to the housing and exerting a predetermined force against rotation of the stop means so that, after the spindle has been locked against rotation by the inertia wheel engaging the stop means and the force exerted upon the seat belt exceeds the predetermined force energy is absorbed by further restricted rotation of the locked spindle, inertia wheel and stop means relative to the housing, in a direction in which the seat belt is unwound from the spool portion, against the force exerted by the spring-loaded coupling means.

3. A seat belt reel for use in a vehicle, comprising:

a housing, a spindle rotatable within the housing, the spindle including a spool portion to which is fastened one end of the seat belt, and a threaded portion having at least one helical screw thread of coarse pitch, spring means urging the spindle to rotate in a direction in which the seat belt is wound upon the spool portion, an inertia wheel adapted to engage upon the screw thread of the threaded portion of the spindle and to rotate with it in either direction, any rapid changes in the rotation of the spindle causing the inertia wheel to move along the threaded portion of the spindle in a direction dependent upon the direction of rotation of the spindle, a stop means adjacent the spindle, and adapted to be rotationally lockingly engaged by the inertia wheel when rapid change in rotation of the spindle occurs in a direction in which the seat belt is unwound from the spool portion, a friction pad coupling means connecting the stop means to the housing, and a pressure-adjusting means located between the housing and the friction pad coupling means, and loading the friction pad coupling means to impede rotation of the stop means relative the housing, so that, after the spindle has been locked against rotation by the inertia wheel engaging the stop means and the force exerted upon the seat belt exceeds a predetermined amount, energy is absorbed by further restricted rotation of the locked spindle, inertia wheel and stop means relative to the housing, in a direction in which the seat belt is unwound from the spool portion, against the braking force exerted by the friction pad coupling means, the predetermined amount of force required to cause further rotation being governed by the pressure-adjusting means.

4. A seat belt reel for use in a vehicle, comprising:

a housing, a spindle rotatable within the housing, the spindle including a spool portion to which is fastened one end of the seat belt, and a threaded portion having at least one helical screw thread of coarse pitch, spring means urging the spindle to rotate in a direction in which the seat belt is wound upon the spool portion, an inertia wheel adapted to engage upon the screw thread of the threaded portion of the spindle and to rotate with it in either direction, any rapid changes in the rotation of the spindle causing the inertia wheel to move along the threaded portion of the spindle in a direction dependent upon the direction of rotation of the spindle, a stop means adjacent the spindle, and adapted to engage with the inertia wheel when rapid change in rotation of the spindle occurs in a direction in which the seat belt is unwound from the spool portion, a spring-loaded coupling means connecting the stop means to the housing, and exerting a predetermined force against rotation of the stop means, and means associated with the housing and adjustable to set the predetermined force exerted by the spring-loaded coupling means, so that, after the spindle has been locked against rotation by the inertia wheel engaging the stop means and the force exerted upon the seat belt exceeds the predetermined amount, energy is absorbed by further restricted rotation of the locked spindle, inertia wheel and stop means relative to the housing, in a direction in which the seat belt is unwound from the spool portion, against the force exerted by the spring-loaded coupling means.

* * * * *

PO-1050
(5/69)

UNITED STATES PATENT OFFICE
CERTIFICATE OF CORRECTION

Patent No. __3,666,198__    Dated __May 30, 1972__

Inventor(s) __Bernhard Neumann__

It is certified that error appears in the above-identified patent and that said Letters Patent are hereby corrected as shown below:

Column 3, lines 36 and 37, the language "rotationally lockingly engaged by the inertia wheel when rapid change in rotation of the spindle occurs" should be deleted and -- to acceleration of -- should be inserted;

line 38, "unwound" should be changed to -- 1 -- and "portion," should be changed to --out --;

line 39, "the" (third occurrence) should be deleted.

Signed and sealed this 13th day of February 1973.

(SEAL)
Attest:

EDWARD M. FLETCHER, JR.
Attesting Officer

ROBERT GOTTSCHALK
Commissioner of Patents